(12) United States Patent
Witmer et al.

(10) Patent No.: US 10,782,590 B2
(45) Date of Patent: Sep. 22, 2020

(54) DOUBLY-RESONANT ELECTRO-OPTIC CONVERSION USING A SUPERCONDUCTING MICROWAVE RESONATOR

(71) Applicant: The Board of Trustees of the Leland Stanford Junior University, Palo Alto, CA (US)

(72) Inventors: Jeremy D. Witmer, Los Altos Hills, CA (US); Patricio Arrangoiz-Arriola, Stanford, CA (US); Jeff T. Hill, Sunnyvale, CA (US); Amir H. Safavi-Naeini, Palo Alto, CA (US); Timothy Patrick McKenna, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 555 days.

(21) Appl. No.: 15/791,105

(22) Filed: Oct. 23, 2017

(65) Prior Publication Data
US 2018/0113373 A1    Apr. 26, 2018

Related U.S. Application Data

(60) Provisional application No. 62/413,170, filed on Oct. 26, 2016.

(51) Int. Cl.
*H04B 10/00* (2013.01)
*G02F 1/39* (2006.01)
(Continued)

(52) U.S. Cl.
CPC .............. *G02F 1/39* (2013.01); *G02F 1/017* (2013.01); *G02F 1/3534* (2013.01); *H01P 7/082* (2013.01);
(Continued)

(58) Field of Classification Search
CPC ........ G02F 1/0018; G02F 1/0063; G02F 1/35; G02F 2202/32; H04B 10/70
See application file for complete search history.

(56) References Cited

U.S. PATENT DOCUMENTS 7,715,081 B1    5/2010   Krawczak
7,889,992 B1    2/2011   DiVincenzo et al.
(Continued)

OTHER PUBLICATIONS

Tsang, "Cavity quantum electro-optics", 2010, Phys. Rev. A v81, pp. 063837(1-5).
(Continued)

*Primary Examiner* — Daniel G Dobson
(74) *Attorney, Agent, or Firm* — Lumen Patent Firm

(57) ABSTRACT

A doubly resonant electro-optic converter is provided. An optical resonator and a microwave resonator are disposed such that fields from the two resonators can interact in an electro-optic active medium. The optical resonator is a planar photonic crystal optical resonator, and the microwave resonator is at least partially superconducting in operation. The active medium has a second order nonlinearity capable of generating a sum frequency signal and/or a difference frequency signal from the optical and microwave fields. The resulting structure has both quantum and classical applications.

19 Claims, 11 Drawing Sheets

(51) Int. Cl.
  *H01P 7/08*   (2006.01)
  *G02F 1/017*  (2006.01)
  *G02F 1/35*   (2006.01)
  *H04J 14/00*  (2006.01)
  *H01P 5/08*   (2006.01)

(52) U.S. Cl.
  CPC ...... *G02F 2202/32* (2013.01); *G02F 2203/15* (2013.01); *H01P 5/08* (2013.01)

(56) References Cited

U.S. PATENT DOCUMENTS

| | | |
|---|---|---|
| 8,094,359 B1 | 1/2012 | Matsko et al. |
| 9,350,460 B2 | 5/2016 | Paik |
| 2014/0314419 A1* | 10/2014 | Paik ................. B82Y 10/00 398/115 |
| 2015/0060756 A1* | 3/2015 | Park ................. B82Y 20/00 257/9 |
| 2017/0227795 A1* | 8/2017 | Bishop ............. G02B 6/29341 |
| 2017/0261771 A1 | 9/2017 | Bishop et al. |

OTHER PUBLICATIONS

Reagor et al., "A quantum memory with near-milisecond coherence in circuit QED", 2015, arXiv:1508.05882v2.

Rueda et al., "Efficient single sideband microwave to optical conversion using an electro-optical whispering gallery mode resonator", 2016, arXiv:1601.07261v1.

\* cited by examiner

DOUBLY-RESONANT ELECTRO-OPTIC CONVERSION USING A SUPERCONDUCTING MICROWAVE RESONATOR

CROSS REFERENCE TO RELATED APPLICATIONS

This application claims the benefit of U.S. provisional patent application 62/413,170, filed on Oct. 26, 2016, and hereby incorporated by reference in its entirety.

FIELD OF THE INVENTION

This invention relates to doubly resonant interaction between optical fields and microwave fields.

BACKGROUND

Quantum technologies have been undergoing a veritable revolution with the development of highly coherent scalable superconducting quantum circuits in the last decade. Currently one of the most promising candidate technologies involves superconducting circuits operating deep inside dilution refrigerators. These circuits are now starting to operate at large enough fidelities to allow for indefinite storage and processing of quantum information. This has led to rapidly intensifying efforts to demonstrate nontrivial quantum-enhanced functionality. These quantum circuits are highly sensitive to any disturbance from the environment and rely on the careful engineering and research that has gone into isolating the "qubits" from the destructive impact of the environment inside and outside of the refrigerator. Accessing the quantum circuits and robustly controlling their internal processes within a shielded cryogenic system operating at below 20 mK with minimal disturbance is tremendously difficult and the current approaches are not amenable to scaling.

Additionally, in systems designed for quantum sensing and communication, each quantum processor must have a way to connect to the outside world and other distant subsystems in a coherent manner—a requirement fundamentally at odds with the current approaches. Light, and in particular near-infrared radiation at around 1.5 microns, is currently established as the only realistic way that distant nodes in quantum networks can be interconnected (though shorter distances can be connected via other colors of light). The reasoning is exactly analogous to why light is used as the infrastructure underlying the internet: these photons are largely immune from thermal noise and capable of being transmitted efficiently over long distances by optical fibers. Light can also provide us a way to interconnect and efficiently control the quantum processes inside a dilution refrigerator, drastically reducing the number of control lines required to operate a quantum machine.

Accordingly, it would be an advance in the art to provide electro-optic modulators suitable for use in such quantum systems. These electro-optic modulators are also expected to have applications in classical systems.

SUMMARY

Quantum devices and processors will require new classes of optoelectronic devices capable of transducing quantum signals. These transducers will open new opportunities in long distance quantum communications and sensing. We provide a device analogous to a classical electro-optic modulator that is capable of converting quantum information from microwave frequency superconducting quantum processors into optical frequency photons in the telecom band. For example, it is expected that a fully electro-optic approach utilizing resonant optical and microwave circuits on Lithium Niobate (LN) is capable of allowing quantum conversion between optical and microwave excitations at millikelvin temperatures with sufficiently high efficiency to be of value for quantum communication systems.

Heterogeneously integrated nonlinear photonic circuits combining silicon optical cavities with LN can enable long-lived photonic states ($Q>10^6$) on the surface of bulk LN. Microwave resonators on lithium niobate substrates can be designed to allow significant overlap between the microwave electric field and the optical resonator volume. Heating in a cryogenic environment is an issue to consider. Microwave and optical losses in an integrated converter can most likely be reduced sufficiently to allow for high efficiency conversion. Ways of minimizing heating due to absorption and scattering of photons are considered.

A packaged silicon/LN device is expected to enable quantum conversion from microwave to telecom with high efficiency (>10%). This will set the stage for further applications, such as secure quantum communication networks that can utilize the emerging power of superconducting quantum information processors as repeater nodes.

DETAILED DESCRIPTION

Section A describes general principles relating to embodiments of the invention. Section B considers an illustrative example (silicon photonic resonator on a lithium niobate substrate) in detail. Section C relates to a further exemplary embodiment.

A) GENERAL PRINCIPLES

Figure 1A:
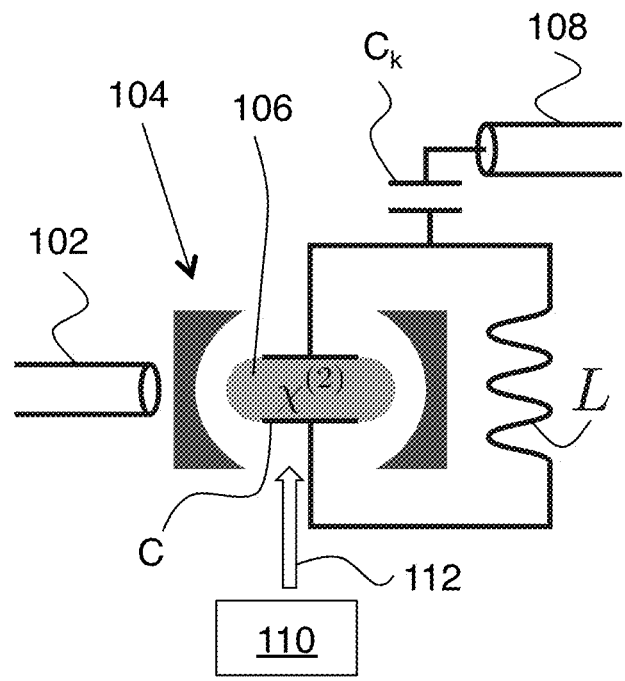
FIG. 1A shows an embodiment of the invention.

FIG. 1 schematically shows an embodiment of the invention. In this example, an optical input 102 provides light to a planar photonic crystal optical resonator 104. A microwave input 108 provides microwave energy to a microwave resonator formed by capacitance C and inductance L. At least part of the microwave resonator is configured to be superconducting when the apparatus is operating. An active medium 106 is disposed such that first electromagnetic field from the planar photonic crystal optical resonator 104 and second electromagnetic field from the microwave resonator (L and C) overlap within the active medium. The active medium has a second order nonlinearity capable of generating a sum frequency signal and/or a difference frequency signal from the first and second electromagnetic fields. Here $C_k$ is a coupling capacitance.

In operation, an optical source 110 configured to provide an optical pump field 112 to the planar photonic crystal optical resonator can be provided. This establishes coherent coupling between the planar photonic crystal optical resonator and the microwave resonator. The apparatus can be configured to provide quantum coherent coupling between the planar photonic crystal optical resonator and the microwave resonator, as considered in detail below. Alternatively, the apparatus can be configured to provide classical coherent coupling between the planar photonic crystal optical resonator and the microwave resonator.

Classical operation is defined as operation in the limit of large photon number (i.e., expected photon number of 10 or more) in the relevant coupled optical and microwave signals. Quantum operation is defined as operation in the limit of small photon number (i.e., expected photon number of 5 or less) in the relevant coupled optical and microwave signals. In cases where an optical pump is provided to the optical resonator, the pump field is typically intense enough to be classical (i.e., the pump field is not regarded as one of the coupled signals of the above definitions).

Figure 1B:
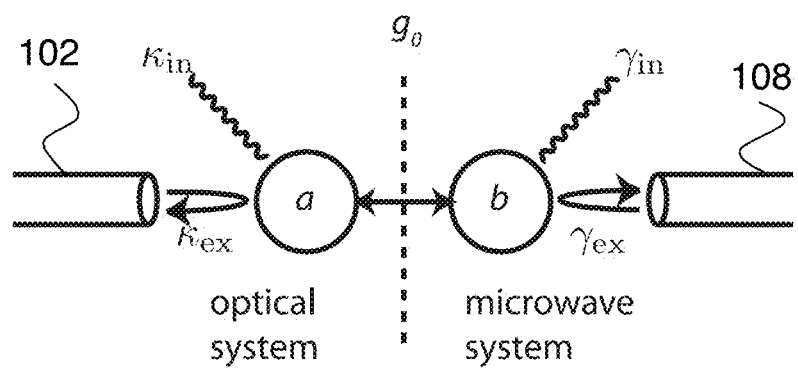
FIG. 1B shows relevant rates for the example of FIG. 1A.

FIG. 1B shows important rates for this physical interaction. Here $g_0$ is the interaction rate, $K_{in}$ is the intrinsic optical loss rate, $\gamma_{in}$ is the intrinsic microwave loss rate, $K_{ex}$ is the optical excitation rate, and $\gamma_{ex}$ is the microwave excitation rate.

Here a structure is referred to as 'planar' if it is generally configured to be disposed on a flat or nearly-flat substrate. This can regarded as being analogous to planar technology as employed in semiconductor fabrication and confers the same benefits especially as regards ease of manufacture, integration, and scalability. The "optical" region of the electromagnetic (EM) spectrum refers approximately to the region with wavelengths between 100 nm (3 PHz frequency) and 1 mm (300 GHz) comprising the ultraviolet, visible, and infrared regions. Of particular interest is the near-infrared band used for fiber optic telecommunication, extending roughly from 1260 to 1675 nm, as well as the visible band, extending from 390 to 780 nm. The "microwave" region of the EM spectrum refers approximately to the region with frequencies between 300 GHz (1 mm) and 300 MHz (1 m).

A "photonic crystal optical resonator" is an optical resonator where part of the structure of the resonator is a periodic dielectric structure having a photonic band gap. Frequently such resonators are fabricated by introducing a defect or waveguide section into what would otherwise be a periodic structure. Some embodiments make use of photonic crystal structures, which are analogous structures having an acoustic band gap rather than an optical band gap. "Coherent coupling" refers to a conversion process that converts energy from one mode to another while maintaining quantum entanglement and without adding quantum noise. This is achieved by using the optical cavity linewidth and pump laser detuning to engineer the photonic density of states around the pump laser so that Stokes or anti-Stokes sideband scattering processes can be selectively enhanced or inhibited. By setting the laser frequency to be red detuned by a microwave frequency from the optical cavity, the Stokes process is inhibited, eliminating quantum noise in the conversion process. This enables quantum coherent coupling between the microwaves and the sideband photons. By setting the laser frequency to be blue detuned from the cavity, the anti-Stokes process is inhibited, and Stokes sideband photons are generated with microwave photons simultaneously, leading to entanglement between the optical and microwave field.

Figure 2A:
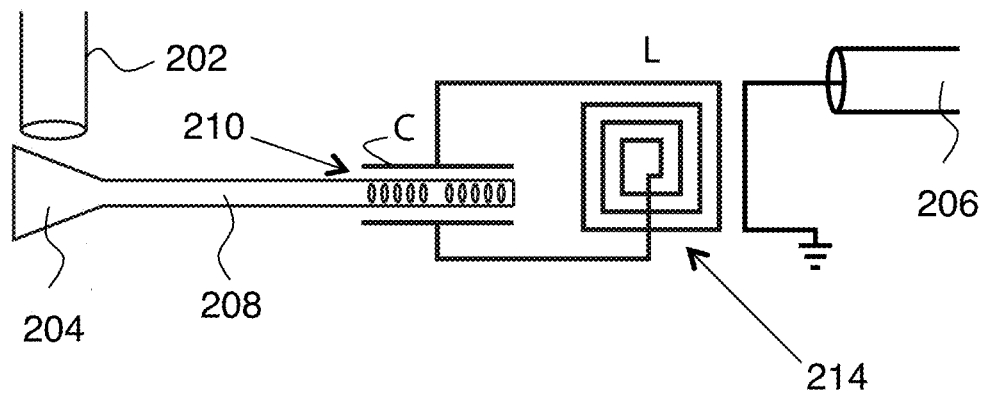
FIGS. 2A-D shows exemplary embodiments of the invention.
Figure 2B:
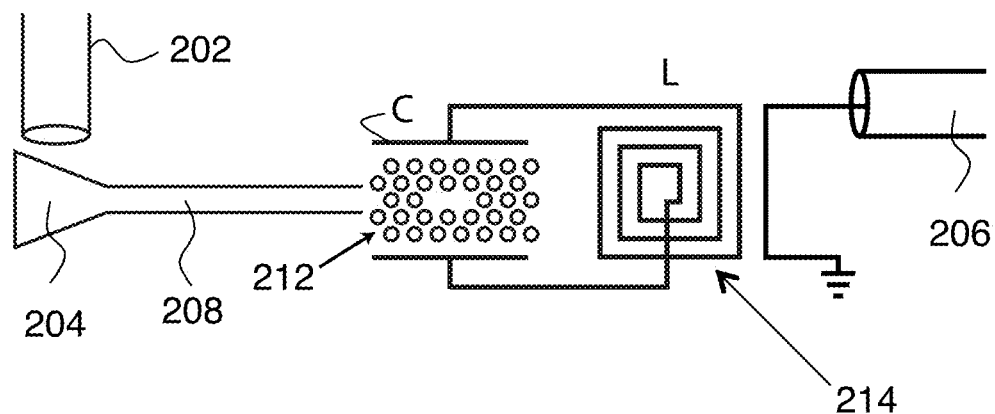
Figure 2C:
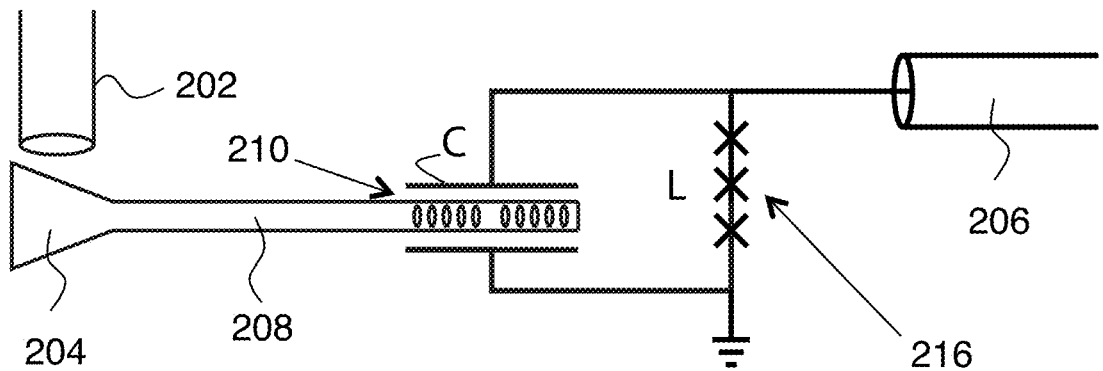
Figure 2D:
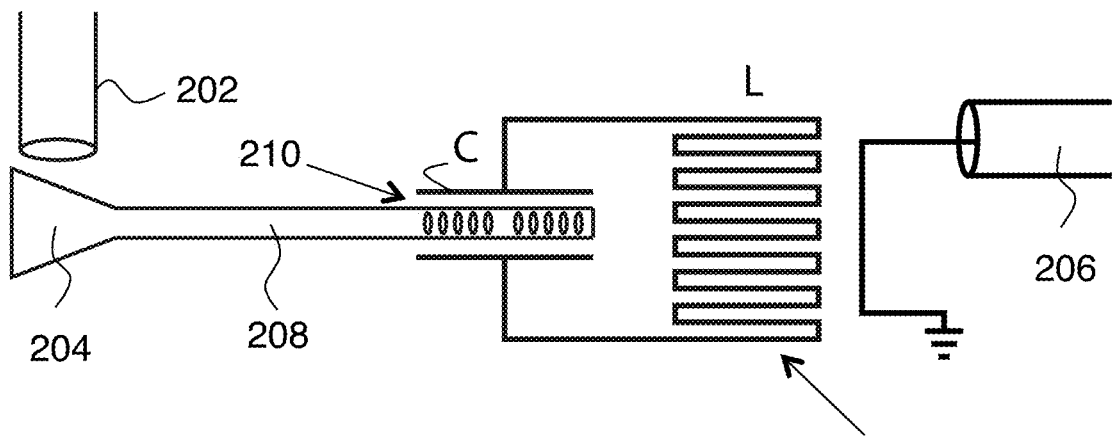

FIGS. 2A-D show further exemplary embodiments of the invention. Here 202 is an optical fiber and 206 is a microwave transmission line. An optical coupler 204 couples fiber 202 to optical waveguide 208. Optical waveguide 208 is fabricated to include a planar photonic crystal resonator. Practice of the invention does not depend critically on the type of planar photonic crystal optical resonator that is employed. For example, a 1-D photonic crystal resonator 210 can be employed (FIGS. 2A, 2C, 2D). Alternatively, a 2-D photonic crystal resonator 212 can be employed (FIG. 2B).

As indicated above, the microwave resonator is an LC resonator. The microwave resonator preferably includes a planar capacitor C having capacitor plates disposed to sandwich the planar photonic crystal optical resonator, as shown on FIGS. 2A-D. Preferably at least these capacitor plates are superconducting in operation to reduce loss in the microwave resonator, and more preferably the entire microwave resonator is superconducting to further reduce loss in the microwave resonator. Practice of the invention does not depend critically on how the desired inductance value is provided. Options for the inductor include, but are not limited to: a spiral inductor (214 on FIGS. 2A-B), a Josephson junction array (216 on FIG. 2C), and a meander inductor (218 on FIG. 2D).

Figure 3A:
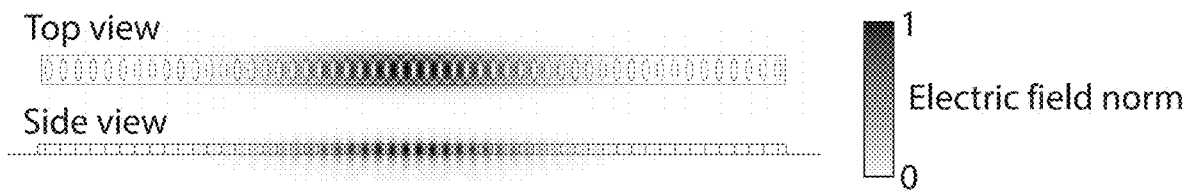
FIG. 3A shows multiphysics modeling results for an optical resonator mode.
Figure 3B:
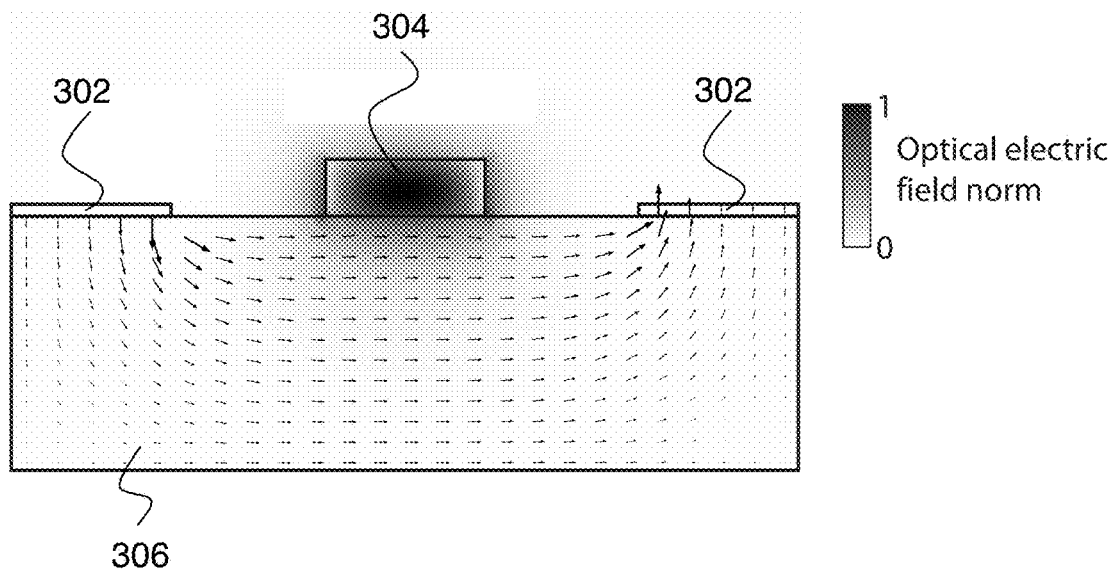
FIG. 3B shows overlap of optical and microwave fields in an exemplary interaction geometry.

There are various alternatives for how the active medium is disposed relative to the optical and microwave resonators. One approach is to have the active medium configured as a substrate on which the planar photonic crystal optical resonator and the microwave resonator are disposed. FIGS. 3A-B show an example of this approach. FIG. 3A shows the optical mode of a planar photonic crystal resonator, which is seen to extend outside the resonator in the side view. This effect is exploited in the experiments described below by fabricating the planar photonic crystal resonator in silicon and disposing this resonator on a lithium niobate substrate. The resulting structure is shown on FIG. 3B, where 304 is the photonic crystal resonator, 306 is the lithium niobate substrate, and 302 are the planar capacitor plates of the microwave resonator. The optical field of the resonator mode is schematically shown by the shading, and the microwave field is schematically shown by the arrows on FIG. 3B. Since the shading and arrows overlap in active medium 306, the desired interaction can occur. In addition to applying the microwave frequency electric field, the electrodes in FIG. 3B or 3C can also simultaneously be used to apply a DC electric field. Via the electro-optic effect, this DC electric field will cause a DC shift in the optical resonance frequency. This could be very useful for tuning multiple electro-optic converters with different frequencies into resonance.

Figure 3C:
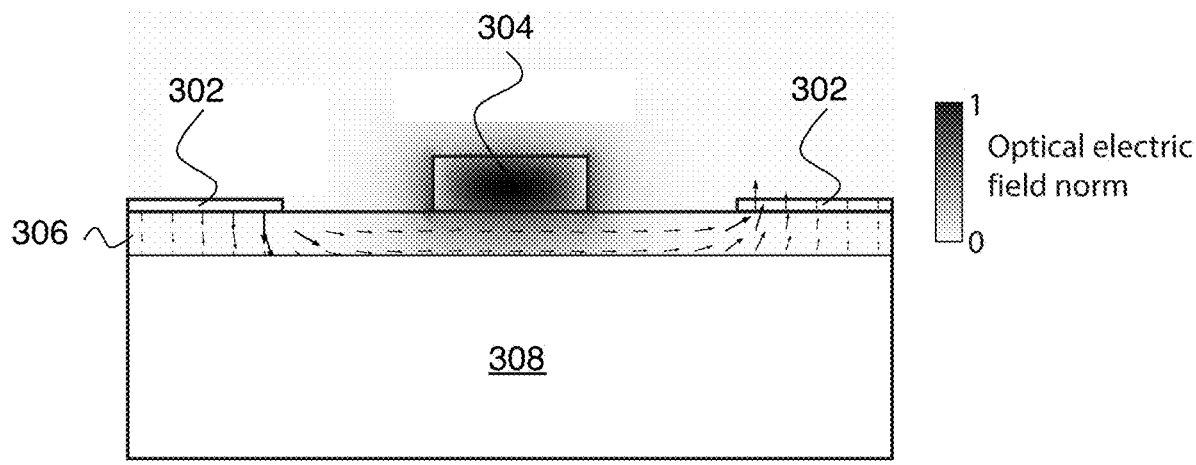
FIG. 3C shows a variation of the example of FIG. 3B.

Another alternative is for the active medium to be configured as a layer of active medium disposed on a substrate of a different material. FIG. 3C shows an example, where active medium 306 is disposed on substrate 308. For example 306 can be thin film lithium niobate and 308 can be a silicon or silicon-on-insulator (SOI) substrate. A further alternative is for the material used for the planar photonic crystal resonator to itself be the active medium. An example of this would be if 304 on FIG. 3B were a planar photonic crystal optical resonator fabricated in lithium niobate instead of silicon.

Figure 4A:
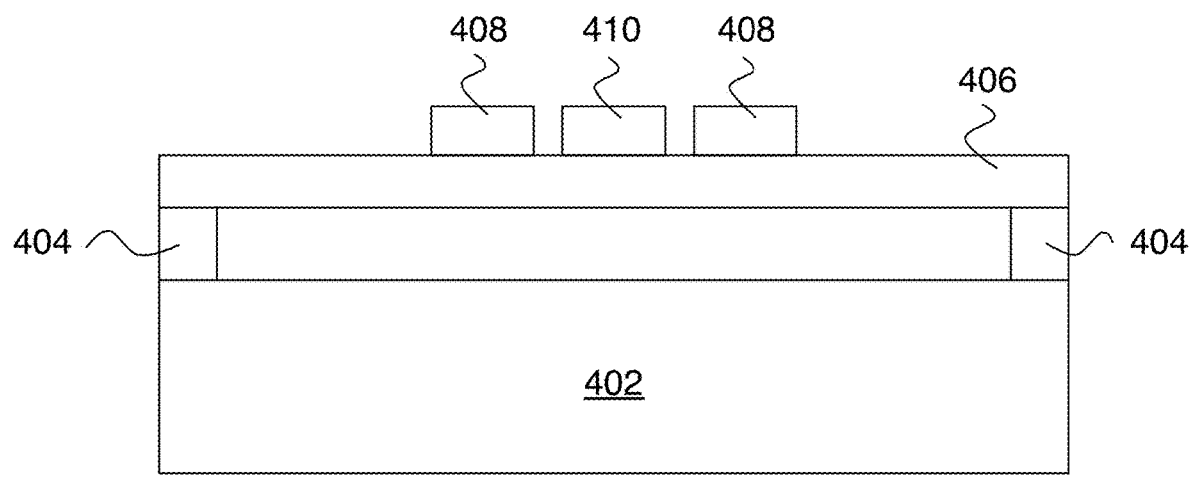
FIG. 4A shows an embodiment having the active medium suspended above the substrate to reduce acoustic loss.

The active medium can also be configured as a layer of active medium suspended over a substrate. FIG. 4A shows an example, where active medium 406 is suspended above substrate 402 by support members 404. Here 408 are the planar capacitor plates of the microwave resonator and 410 is the planar photonic crystal optical resonator. This structure advantageously reduces acoustic loss from the microwave resonator into the substrate. Acoustic loss is expected to be relevant in most cases because typical materials for the active medium are piezoelectric in addition to having the desired electromagnetic nonlinearity. Because of this piezoelectric effect, excitation of the microwave resonator will tend to generate acoustic radiation which is a loss mechanism for the microwave resonator. Therefore, reducing the ability of this acoustic radiation to escape from the system amounts to reducing loss, which is highly desirable.

Figure 4B:
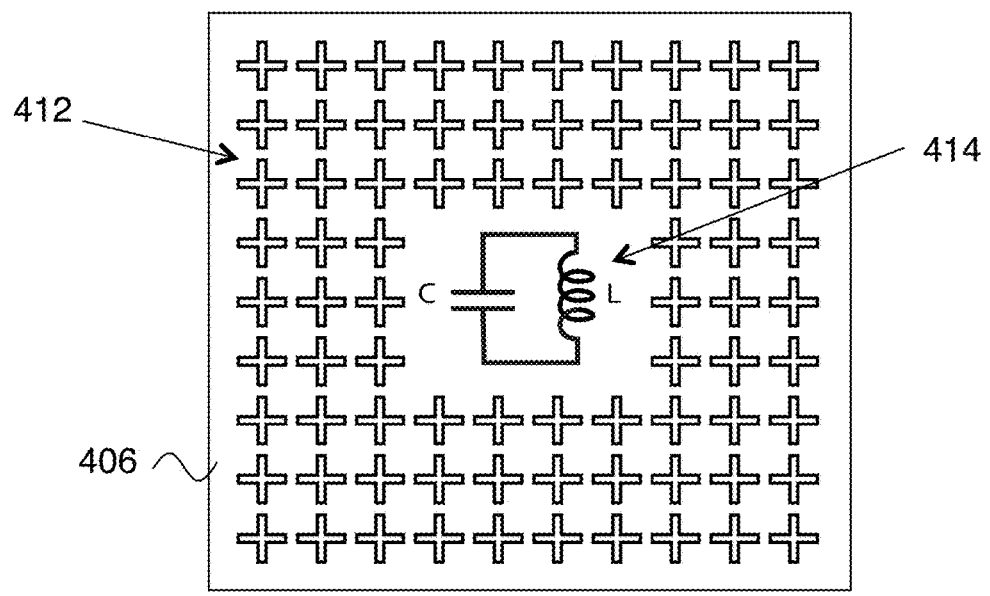
FIG. 4B shows an example of use of a phononic crystal structure to further reduce acoustic loss in the structure of FIG. 4A.

Acoustic loss can be further reduced by including an acoustic insulator structure in the active medium configured to reduce acoustic radiation away from the microwave resonator. This acoustic insulator structure can be a phononic crystal structure. FIG. 4B shows an example. Here 412 is the phononic crystal structure and is preferably configured to create an acoustic band gap at the operating frequency of the microwave resonator. This will suppress acoustic radiation away from microwave resonator 414, thereby reducing loss.

Practice of the invention does not depend critically on the material used for the active medium. Suitable active media include, but are not limited to: lithium niobate, lithium tantalate, gallium arsenide and electro-optic polymers.

The microwave resonator can be configured to apply a DC electric field to the optical resonator, thereby altering an optical resonance frequency of the optical resonator.

The planar photonic crystal optical resonator can include a waveguide having a slot where the active medium is disposed in the slot. This is particular useful for active media that can be conformally deposited, such as electro-optic polymers.

B) DESIGN EXAMPLE

B1) Introduction

We consider a device that provides a scalable and high bandwidth electro-optical link between travelling photons at optical frequencies and microwave photons inside a millikelvin temperature dilution refrigerator: a so-called "quantum electro-optical converter" (QEOC). Though there are many ongoing attempts at demonstrating such converters, and remarkable progress has been made, successful optical to microwave conversion preserving any of the quantum signatures of the electromagnetic field is yet to be achieved. It is our belief that for such a converter to be interesting, it needs to provide sufficient bandwidth, high bit-rate, low heating, as well as a realistic path to scalability. These are requirements that make such a converter an enabling technology for quantum communication networks. Our focus is on solid-state based approaches. At a purely conceptual level, nearly all device approaches to date use parametric driving of weakly nonlinear processes to obtain perfect conversion between two energy-disparate degrees of freedom (with the pump field providing the extra energy).

The weak second-order nonlinearity, with interaction energy $\hat{a}^\dagger \hat{a}(\hat{b}^\dagger + \hat{b})$ between the two degrees of freedom $\hat{a}$ and $\hat{b}$, can arise either from the intrinsic material properties such as those commonly found in nonlinear optical materials, or alternatively from the coupling between optical radiation and mechanical motion via radiation pressure. In the optomechanics case, $\hat{b}$ is the annihilation operator for phonons. Recent work has also investigated using magnons coupling to microwave resonators that can be read out through magneto-optical coupling to give rise to an analogous interaction but with $\hat{b}$ representing the operator that annihilates a magnon. In one approach involving mechanical resonators, first proposed and demonstrated by us, two back-to-back second-order nonlinear processes are required to convert the electromagnetic radiation at one frequency to mechanics and then back into electromagnetic radiation at a different frequency. In these approaches, the weak second-order nonlinearity is from the optomechanical interaction where the intensity of an electromagnetic field couples to the position of the mechanical system giving rise to a nonlinearity of the form $\hat{a}^\dagger \hat{a} \hat{x}$ in the interaction Hamiltonian. These nonlinearities are usually significantly larger than that found in typical optical nonlinear materials, which is why much of the effort has focused in recent years on using mechanics to do the required conversion.

However, using mechanical systems as an intermediary comes at a cost: in the required triply-resonant systems (conversion from optics to mechanics, and then mechanics to microwave), the mechanical resonator needs to be roughly acoustic-wavelength-scale to have sufficient coupling for the conversion process to work. Large (>100 microns) silicon nitride membranes with MHz frequencies have been used though such approaches are significantly limited in bandwidth by the frequency of the mechanical resonator, and suffer from thermal noise due to conversion to a lower frequency mechanical subsystem. On the other hand, in approaches utilizing GHz mechanical resonators with sub-cubic-micron mode volumes, where larger bandwidths are available, optical absorption in the suspended nanofabricated structure causes an unmanageable amount of heating that cannot be easily dissipated and has limited such experiments to date.

We begin by re-evaluating the core assumption that nonlinear optical materials are incapable of providing sufficient nonlinearity for the conversion process. As we will show below, by engineering both the optical resonator, and the superconducting microwave circuit, coupling rates comparable to that found in optomechanical systems can be obtained. By using hybrid integration of silicon photonics with Lithium Niobate (LN) and superconducting nanoelectronics, a converter that can approach unity efficiency with a manageable heat load is within reach.

The most important aspects of our approach are (1) using high-Q optical resonances in heterogeneously integrated silicon/LN to obtain localized long-lived optical resonances with large electro-optical coupling, (2) using nanopatterned superconducting resonators with the eventual integration of large inductors (or kinetic "superinductors") to focus the electromagnetic fluctuations of a microwave resonator into the optical micron-scale mode volume. We believe that conversion efficiencies approaching unity are possible in such a doubly-resonant electro-optic system by careful engineering of the material system, the photonic resonator design, and the superconducting microwave circuit. The issues related to heating are greatly simplified in our approach, compared to optomechanical approaches, since optical absorption is no longer occurring in a suspended nanostructure, but on the surface of a bulk LN crystal with many orders of magnitude higher heat capacity and thermal coupling. In addition there is no lower frequency mechanical resonator which needs to be properly isolated both thermally and vibrationally from the environment, greatly simplifying the scalability of the converter.

In comparison to previous approaches, our method has several distinct advantages. Compared to mechanically-mediated conversion schemes that utilize MHz frequency mechanical resonators in Fabry-Perot cavities, our scheme has the advantage of having a far larger bandwidth (kHz vs. MHz), and ease of deployment and scalability, since it would be fully packaged and can be utilized in a standard dilution refrigerator without optical access. Compared to optomechanically mediated conversion to GHz mechanical modes that are then read out piezoelectrically, our approach has two advantages—it does away with needing to obtain high coupling efficiency between localized mechanics and microwaves on piezo-electric substrates which currently leads to >20 dB loss in experiments, it also works around the major challenges of localized optical heating of the optomechanical system due to laser light, by using photonic structures fully connected to a bulk crystal that can dissipate heat quickly, in contrast to very lightly tethered suspended nanostructures common in optomechanics.

In comparison to magnon-based approaches, our devices are simpler, and we also believe that larger coupling rates are achievable in our system due to the very small measured magneto-optical coupling rates and opto-magnonic systems. Finally, a recent effort has used LN optical whispering gallery modes in a 3D microwave cavity for electro-optical frequency conversion. This experiment was limited to small conversion rates (compared to microwave loss rates). In our approach, by using chip-scale resonators with far smaller mode volume, we take advantage of the fact that the interaction rate increases as $V^{-3/2}$ as we reduce volume, while the microwave loss rate of our coplanar superconducting resonator should remain limited by the dielectric loss tangent of LN ($10^{-4}$-$10^{-5}$)—the same Q limit for the much larger volume 3D cavity.

Our devices will have major implications in the fields of quantum communication, computation, and sensing, as well as the development of a "quantum internet". By enabling superconducting quantum circuits to interface with optical photons, we allow advances in microwave quantum information processors to translate into quantum communication technologies that replace the need for long quantum memories with quantum computational overhead.

B2) Technical Approach

We provide a chip-scale quantum electro-optic converter using localized silicon photonic resonances that sense through the electro-optic effect the fluctuations of a nearby microwave system. The technical requirements and figures of merit for this converter overlap but are distinguishable from those of interest in classical electro-optical modulators technologies. There are four basic metrics: coherence, bandwidth, heat load, and scalability.

Coherence:

The physical mechanism that mediates conversion must operate coherently. The Pockels effect in electro-optic materials is believed to be such a mechanism. On the other hand, mechanisms that operate by inducing large absorption or involve diffusive transport of free carriers are likely not capable of maintaining coherence, though this point merits further investigation.

The requirements for bandwidth, small heat load, and scalability also differ significantly from the metrics important in high speed photonic systems.

Though our bandwidth requirements are less stringent than comparable classical technologies, they are still important for demonstrating a deployable device. Microwave quantum circuits generate signals with bandwidths on the order of MHz at center frequencies in the 5-15 GHz range. Even though a resonant optical device can be bandwidth-limiting element for existing classical modulator technologies, an optical resonance with a GHz linewidth would not limit in any way the bandwidth for the quantum systems we are developing—our approach uses optical resonances prominently. In fact for coherent translation, an optical resonance with linewidth smaller than the frequency of the microwave system is required to filter out the quantum noise due to spontaneous scattering (see section B2c). Additionally, the limited bandwidth of the signals we are converting mean we can even utilize microwave resonances to further enhance the interaction. We expect to need a bandwidth of about a MHz for a converter that would be compatible with today's superconducting quantum technologies (without incurring the extra overhead of bandwidth-conversion systems).

Scalability is achieved by using fiber-coupled microfabricated devices that can operate inside the refrigerator environment without need for alignment. Thus packaging is important. Future developments on the photonic side leveraging this scalability would allow us to use optical wavelength-division multiplexing to rapidly switch inputs and outputs on the converter chip, reducing the amount of electronics required inside the refrigerator while allowing for in-situ reconfigurable elements useful for modular architectures.

Finally, heat load is the amount of energy absorbed in the refrigerator due to absorption of optical photons, required for successful conversion of a microwave photon. This is an extremely important consideration for the devices operating at the cold stage of a dilution refrigerator environment where the heat budget is only a few microwatts. In general, our scheme is more robust to local heating than approaches that use suspended or lightly tethered photonic structures. However, total heating is still a problem. One way to mitigate heating is to use a gated scheme where the converter is only operated momentarily while the conversion happens. By gating, it is possible to do conversion at a higher pump laser power. The heat load during conversion effectively sets the quantum bit-rate of the converter: the lower the heat load during conversion, the more quickly the system will recover between consecutive conversion pulses, and the higher the gating duty cycle can be.

Lithium Niobate (LN) has a large electro-optic coefficient and can be used to convert a microwave signal at $\omega_s$ to an optical sideband $\omega_L+\omega_s$ of a laser at $\omega_L$. To reach the quantum regime, we must make our system nearly six orders of magnitude more sensitive over today's state-of-the-art commercial devices. We boost the interaction rates by using a doubly resonant modulator where the interaction is enhanced by integrating an optical and a microwave resonator on the same chip. We pattern photonic cavities that store light in a highly localized volume of the material. Additionally, we provide superconducting microwave resonators on the same chip to co-localize the microwave electric field within a small interaction volume V. Since the driven interaction rate (see section B2c) scales as $V^3$, and we can reduce the volume by at least two orders of magnitude over usual LN modulator configurations, increasing the desired nonlinear scattering rates and enabling quantum efficient optical rectification and modulation can be achieved.

To realize the quantum electro-optic converters, we provide a new nanophotonic platform to enable the desired integration between nonlinear photonics and superconducting quantum circuits. We describe the physical implementation of the system, focusing on the photonics in section B2a, and on the microwave part in section B2b. We then describe the theory of operation in section B2c. Finally we will discuss some of the challenges involved in obtaining high efficiencies in section B2d.

B2a) Optics: Development of Si/LN Photonics and Preliminary Results

We provide photonic crystals as high-Q, low mode volume, electro-optically active photonic resonators on LN. Lithium Niobate remains notoriously difficult to use in nanophotonics due to its resilience to known etching techniques and despite decades of effort motivated by optics and the surface acoustic wave device industry. We sidestep the difficulties in reproducibly etching LN by combining it with thin film silicon which is widely available in the form of silicon-on-insulator (SOI) wafers. The index contrast between silicon ($n_{si}$=3.48) and LN ($n_{LN}$=2.14(e)-2.21(o)) allows a thin layer of silicon on the order of 200 nm to confine light, with some field overlap into the LN. Silicon is much easier to process using established patterning and etching techniques, and by following a hybrid integration method, we create nonlinear silicon photonic elements that localize the optical field inside the lithium niobate.

Figure 5A:
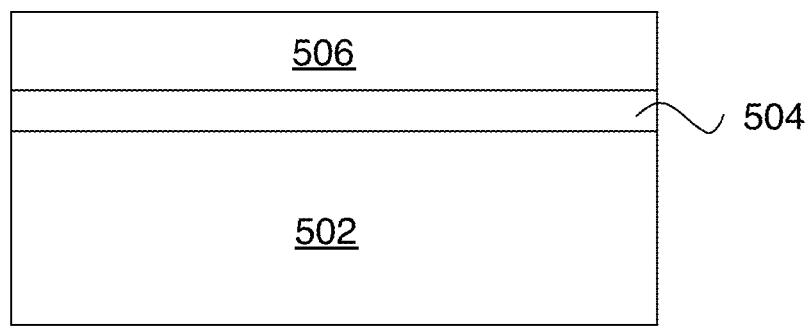
FIGS. 5A-E show an exemplary fabrication sequence for the experiments of section B2 below.
Figure 5B:
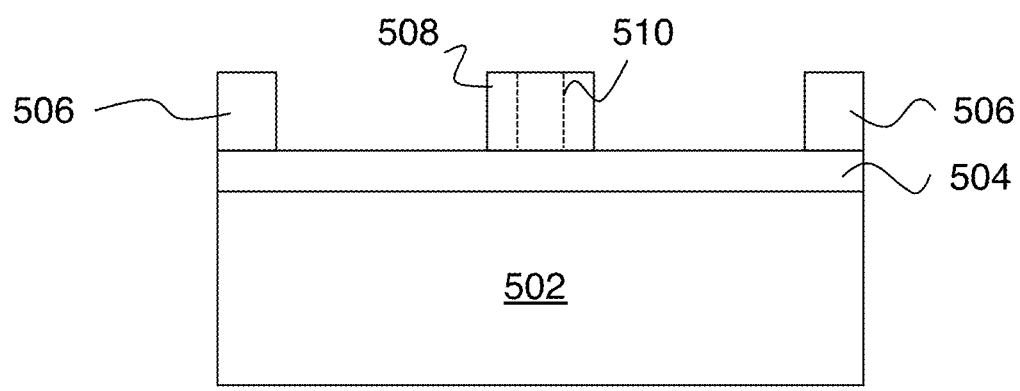
Figure 5C:
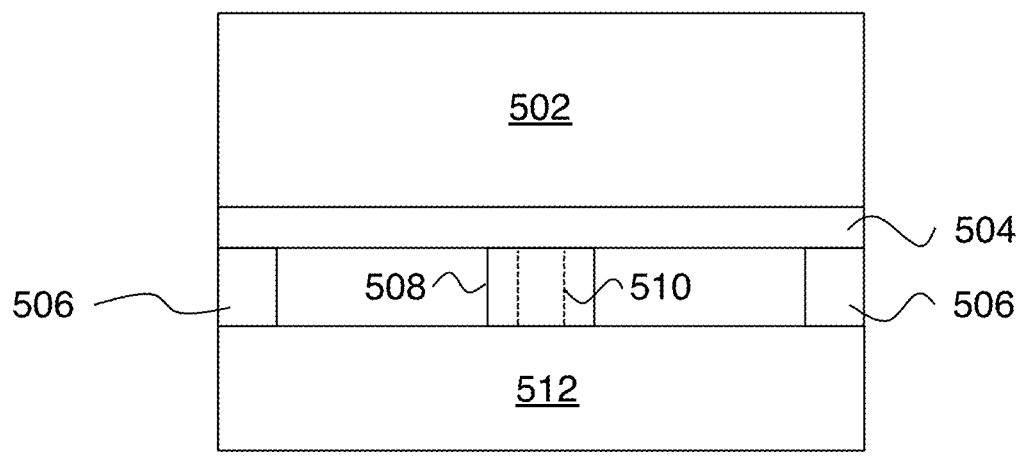
Figure 5D:
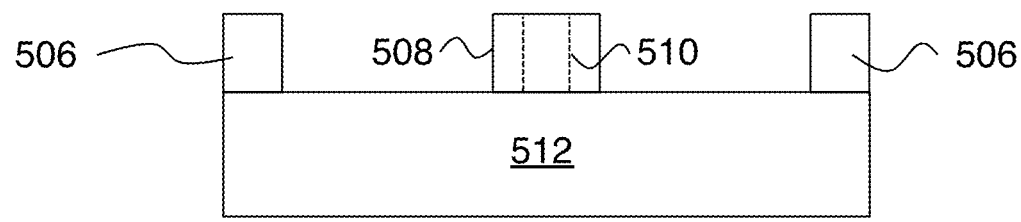
Figure 5E:
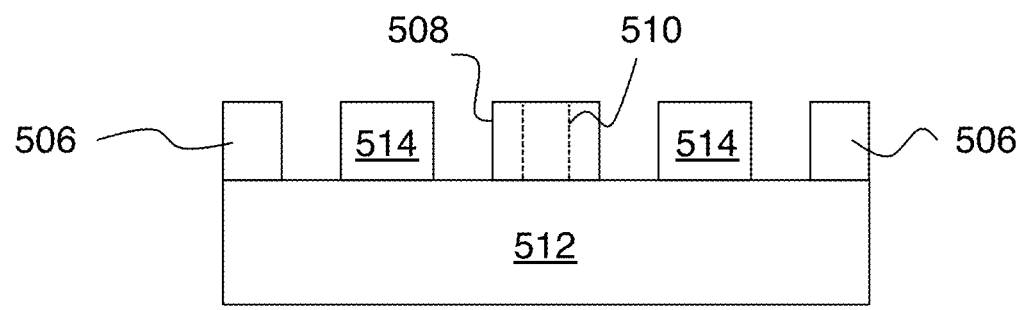
Figure 6A:
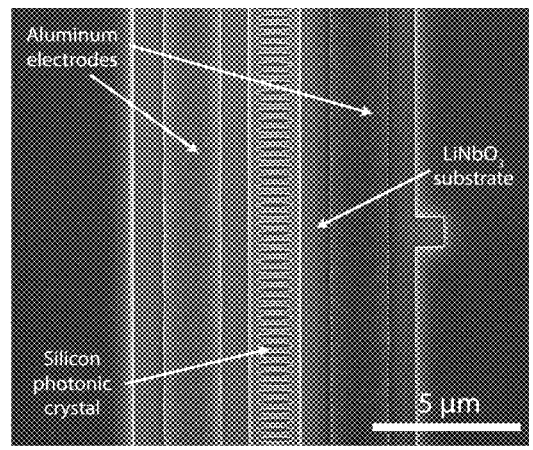
FIG. 6A shows an image of a fabricated experimental structure.

Our basic approach to fabrication is outlined in FIGS. 5A-E. The starting point of FIG. 5A is a silicon on insulator wafer having a silicon substrate 502, an oxide layer 504 and a silicon layer 506. First, the silicon top layer is patterned using either e-beam lithography and dry etching to provide the structure of FIG. 5B. Here 508 is the optical waveguide, and the photonic crystal structure is schematically shown with dotted lines 510. The SOI and the LN chips are then bonded together using a room-temperature direct bonding process to provide the structure of FIG. 5C. Here 512 is the LN chip. A key limitation in the bonding process is the large thermal expansion coefficient mismatch between Si and LN ($2.6 \times 10^{-6}$ K$^{-1}$ for Si compared to $15.7 \times 10^{-6}$ K$^{1}$ for LN along the x and y axes), which limits the temperature at which the bonding process can occur. The need for a high temperature step is averted by using an $O_2$ or Ar plasma treatment to activate the surface. This treatment introduces damage to the surface and creates dangling bonds, resulting in hydrophilic surfaces with a high surface energy. After surface activation a strong bond can be achieved by applying only a minimal amount of pressure. The bulk Si 502 can be removed using a combination of mechanical lapping and either a wet chemical etch or a dry plasma etch. The exposed $SiO_2$ can then be removed using a simple HF dip, resulting in the structure of FIG. 5D. Deposition of planar capacitor plates 514 provides the structure of FIG. 5E. It should be stressed that a key advantage of this platform is that it avoids the need to etch the LN. FIG. 6A is an image of a 1D photonic crystal, fabricated in SOI using e-beam lithography and silicon etching, after being bonded to LN and having the capacitor plates deposited.

Figure 6B:
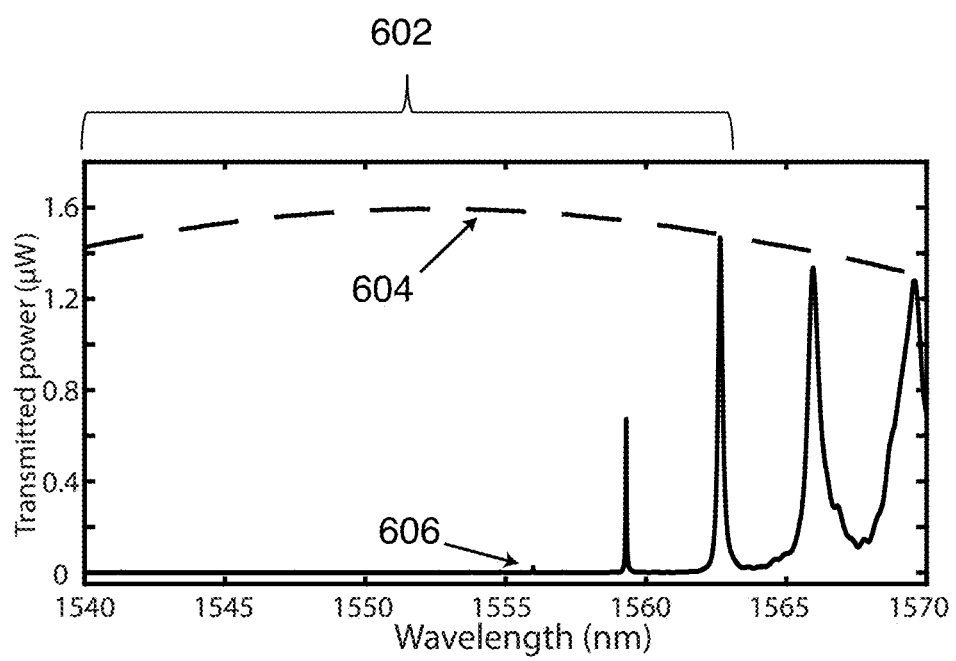
FIG. 6B shows a typical transmission spectrum for the structure of FIG. 6A.
Figure 6C:
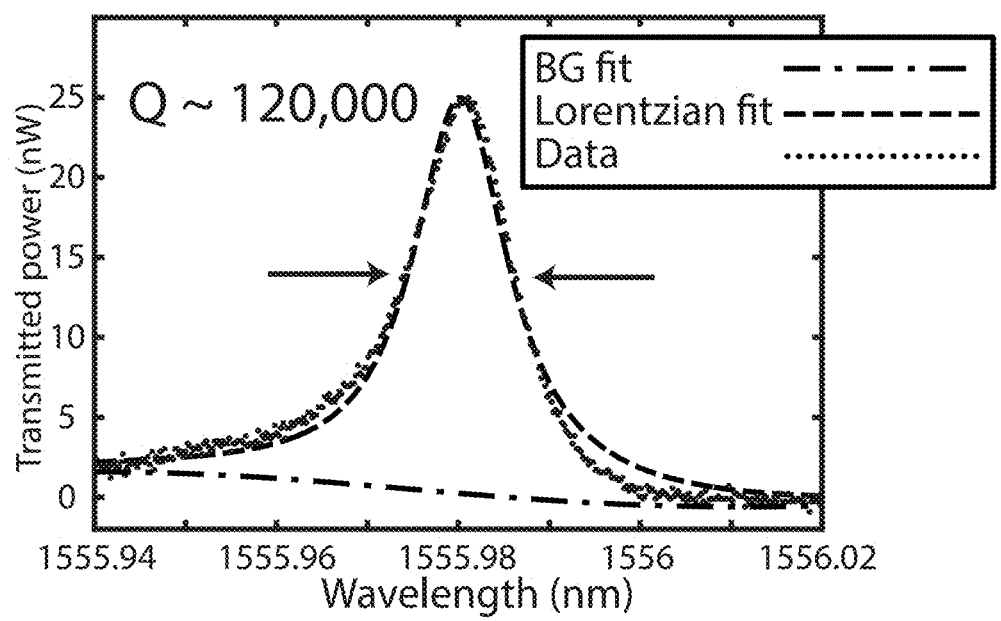
FIG. 6C is a high resolution view of fundamental mode 606 on FIG. 6B.

Simulations of loss-limited optical quality factors have shown that $10^6$ is achievable in such a platform. In our initial measurements, we have observed quality factors greater than $10^5$ on 145 nm silicon films deposited on X-cut lithium niobate (see FIGS. 6B and 6C). Here 602 is the band gap region, 604 is the coupler transmission window, and 606 is the fundamental mode of the planar photonic crystal optical resonator. FIG. 6C shows the resonance of fundamental mode 606 at high wavelength resolution, showing a Q of about 120,000. We believe that with proper optimization, larger quality factors (>$10^6$) can be obtained.

Finally, we have cooled down a bonded Si/LN chip to 4 K and back, and the structures have remained intact. This suggests that the differing thermal expansion coefficients of silicon and lithium niobate, though problematic during the bonding process, do not cause issues after back-side removal when only a thin film of silicon is present.

B2b) Microwaves: Integration of Superconducting Resonators with Si/LN

Superconducting microwave circuits can be integrated on top of the Si/LN hybrid substrate by depositing a superconducting capacitor with the photonic resonator (see FIGS. 2A-D for some examples). A planar capacitor can be defined with electric field permeating through the LN where the optical field is localized for maximum overlap (e.g., as shown on FIGS. 3A-B). Maximizing the coupling between the microwave and optical field is equivalent to bringing this capacitor as close as possible to the photonics, and requiring that this capacitor be part of an LC resonator with as a small a parasitic capacitance as possible. This is not trivial since the small mode volume of the optical resonance causes the capacitance to be quite small (on the order of 5 fF from simulations) so for a 5 GHz microwave resonator, a 200 nH inductance with self-resonance frequency far greater than 5 GHz will be required. We note that the impedance of such a resonant circuit is approximately $Z_{LC}$=6 k$\Omega$. Such a large impedance at GHz frequencies ("superinductance") can be obtained at low temperatures using Josephson Junction arrays (e.g., FIG. 2C).

A superconducting co-planar waveguide resonator that contains the photonic crystal between its two electrodes can be used for proof of principle. This will lead to a system with much larger parasitic capacitance than that described above, but will be much easier to implement. Unity efficiency conversion is still possible with such resonators but at a higher drive laser power, which will lead to heating that may be manageable with proper gating of optical pulses (see section B2d).

We expect quality factors on the order of $10^4$ to $10^5$ for the microwave resonator as informed by recent measurements of the cryogenic properties of lithium niobate.

B2c) Quantum Conversion Theory and Feasibility

Here we describe the scheme for quantum conversion and show why, based on initial measurements and theoretical results, we expect to meet the coherence, efficiency, and heat load requirements for quantum efficient conversion.

The nanofabricated optical resonator on LN has a natural frequency $\omega_c$ with linewidth $\kappa \ll W\omega_s$ and is driven by a laser detuned to $\Delta = \omega_c - \omega_L$. A microwave LC resonator is patterned around the photonic cavity with its capacitive element designed such that a voltage across the capacitor modifies the local refractive index of the medium by $\delta n$ (typical values are on the order of $10^{-4}$-$10^{-3}$ V$^{-1}$) via the electro-optic effect. At telecom frequencies this leads to a shift in the optical resonator frequency of $g_v/2\pi=1$ GHz V$^-$. The second resonant element in the system is a heavily loaded ($Q_\mu \sim 1000$) microwave resonator at frequency $\omega_\mu$ with linewidth $\gamma$. The zero-point fluctuation voltage $V_{zp} \approx 10^{-6} \text{-} 10^{-5}$ V can be multiplied by $g_v$ to give a pure rate $g_0$, the vacuum electro-optical coupling rate. For the systems we consider, $g_0$ is calculated from simulations to be typically on the order of $10^5$ Hz (simulations show $g_0$ ranging from 20-200 kHz depending on exact transducer design). We assume from here on that $g_0/2\pi=30$ kHz, a realistic estimate derived from simulations. Remarkably, this coupling rate is smaller but still comparable to that achieved in optomechanical systems, where GHz mechanical phonons are coupled to optical photons, despite both excitations being photonic in this case, and the GHz microwave resonance being far less localized. The Hamiltonian of the converter described above can be expressed as $$\hat{H}/\hbar = \omega_c \hat{a}^\dagger \hat{a} + \omega_\mu \hat{b}^\dagger \hat{b} + g_0 \hat{a}^\dagger \hat{a})\hat{b}^\dagger + \hat{b}) \quad (1)$$

where $\hat{a}$ is the annihilation operator for photons in the optical resonator, and $\hat{b}$ is the annihilation operator for microwave excitations in the superconducting resonator. Under the action of a pump laser input at frequency $\omega_L$, an intracavity optical photon population of $|\alpha_0|^2$ is generated.

In addition, loss channels as outlined in FIG. 1B are present providing both intrinsic and engineered damping channels for both the optical and microwave photons. The waveguide loading is designed to completely dominate over other loss channels. We expect intrinsic losses $K_{in}$, $\gamma_{in}$ on the order of 100-200 MHz and 100 kHz respectively, and design the loaded $\kappa = K_{in} + \kappa_{ex}$, $\gamma = \gamma_{in} + \gamma_{ex}$ to be more than ten times larger. The system can be solved in the steady state to arrive at a set of scattering matrix parameters directly connecting the optical and microwave fields. The detuned laser drive causes microwave photons to scatter optical photons from the pump at $\omega_L$ to $\omega_L + \omega_s$, acting as a new optical loss channel for the microwaves. At a critical laser drive power this optically-induced loss rate becomes equal to the coupling of the microwave resonator to its feed waveguide leading to a perfectly matched condition where microwave and optical photons are converted with unity quantum efficiency. This matching happens for a critical intracavity drive photon number $|\alpha_0^{QE}|^2$ at which the cooperativity (C) becomes equal to 1:

$$C \sim \frac{4g_0^2 |\alpha_0^{QE}|^2}{\kappa \gamma} = 1 \quad (2)$$

A fairly conservative estimate with $\kappa/2\pi=1$ GHz, $\gamma/2\pi=5$ MHz, $\omega_\mu/2\pi=5$ GHz and $g_0/2\pi=30$ kHz leads to quantum efficient conversion at an intracavity pump photon population of $|\alpha_0^{QE}|^2=1.2\times10^6$ or a pump absorption heat load of at most $P_{heating}^{QE}=\hbar\omega_L \kappa_i |\alpha_0|^2/4=24$ µW. We note that heating this level of power consumption will only be incurred during the conversion, which lasts on the order of microseconds for a temporally matched itinerant photon. Conversion at a rate of 1 kqubit/s can therefore be performed with nanowatts of incurred heating, well within the confines of allowable heat loads in the refrigerator.

B2d) Sources of Inefficiency

The above calculations are for the ideal case. Two primary non-idealities to consider are 1) inefficient optical coupling and insertion loss, 2) parasitic capacitance in the microwave circuit.

Optical Insertion Loss:

The total conversion efficiency is always lower than the optical coupling efficiency, which will be the dominant insertion loss. Currently we are using grating couplers with measured efficiencies of about 15%. We have recently adapted a genetic optimization method of improving grating coupler efficiency, and preliminary simulations show that efficiencies greater than 40% are obtainable. To go to much higher efficiencies, edge coupling and inverse tapered mode-matched waveguides may be needed. Fiber coupling efficiencies approaching 80% (1 dB loss) in coupling to Lithium Niobate waveguides have been reported elsewhere.

Parasitic Capacitance:

A second challenge has to do with parasitic capacitances. Luckily, unlike in electro- and optomechanics approaches where the parasitic capacitance ($C_{par}$) reduces the coupling rate $g_0$ linearly by a factor of $C/(C+C_{par})$ in the large parasitic capacitance limit, in the QEOC case, the parasitic capacitance reduces the coupling by factor of $\sqrt{C/(C+C_{par})}$. The reason for the difference is the following: In the optomechanics case, the conversion process comes from the modulation of a capacitance that causes the modulation of a microwave cavity resonance frequency. Since the microwave cavity resonance frequency is given by the sum of the active and parasitic capacitance, the relative modulation is linearly suppressed by the parasitic capacitance. In the QEOC case, the modulation is due to voltage fluctuations causing a microwave frequency field that is sensed by the photonic cavity. As long as all of the photonic mode is fully immersed in the microwave electric field, it is only the amplitude of the electric field fluctuations $E_{zp}$ that matter. This amplitude is, given a fixed resonance frequency, inversely proportional to the square root of the total capacitance, i.e. $E_{zp} \sim 1/\sqrt{C+C_{par}}$.

Since power requirements are proportional to the square of the coupling rate, this means that we have an increased, but still manageable heat load of about an order of magnitude larger in the unoptimized microwave resonators, which are expected to be dominated by parasitic capacitances.

B3) Conclusion

This work will have a significant impact on quantum technologies. It will simultaneously address two outstanding challenges quantum technologies, scalability and communication, expanding the reach of superconducting quantum processors to the optical domain. We expect that these modulators will form a key component of the first deployments of "useful" quantum circuits, in the form of error correction units in the first quantum networks.

Finally, we expect the modulators, which are essentially quantum-limited detectors of electromagnetic fields at frequencies where such detection is currently difficult, to have wide and unforeseen application in classical applications such as precision electrometry and electro-optic amplification.

C) FURTHER EXAMPLES

Figure 7A:
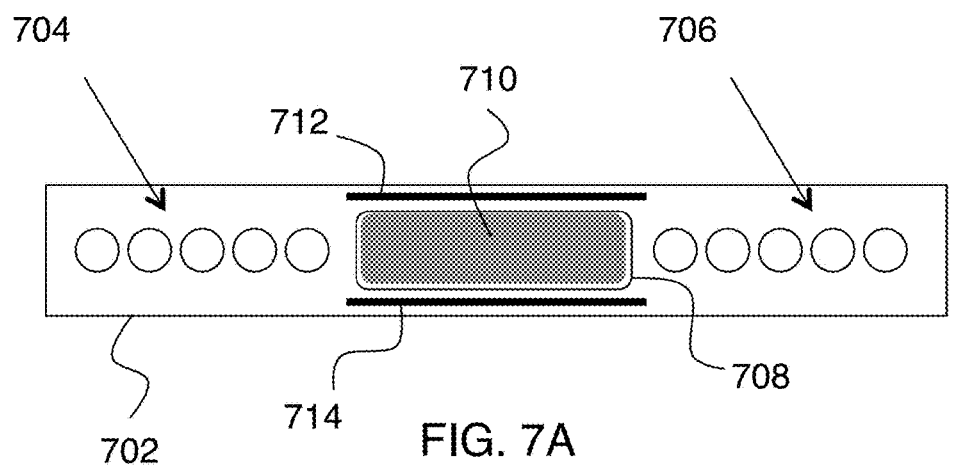
FIG. 7A is a top view of an optical waveguide suitable for use in embodiments of the invention.

FIG. 7A shows a preferred optical waveguide configuration for use in embodiments of the invention. In this example, optical waveguide 702 has a photonic crystal resonator formed by photonic crystal structures 704 and 706. This optical resonator includes a slot feature 708, which is preferably filled with an electro-optic polymer 710. Electrodes 712 and 714 are disposed on two sides of the slot to form the capacitor of the microwave resonator as discussed above.

This configuration provides significant advantages. Electro-optic polymers are particularly promising electro-optic materials. Such polymers include organic chromophore molecules with optical nonlinearities, often embedded into a polymer host material. These materials can have extremely large electro-optic coefficients, up to 400 pm/V. Moreover, since these materials often have small piezoelectric coefficients, it is expected that acoustic wave loss from the microwave resonator will be greatly reduced using this material instead of, e.g., lithium niobate. Finally, since the electro-optic polymer can be spin-coated onto a completed photonic chip as a final processing step, using this material could greatly simplify the fabrication process, making it compatible with CMOS foundries.

Figure 7B:
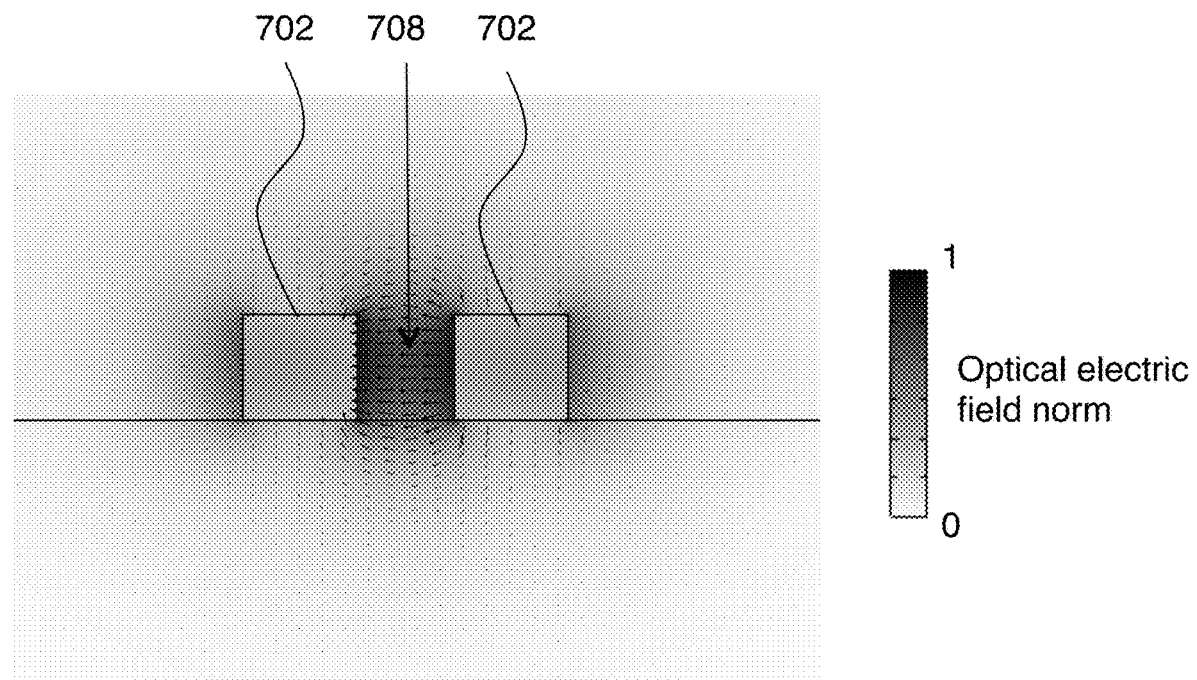
FIG. 7B is a cross section view of the example of FIG. 7A.

If the electro-optic material is an electro-optic polymer, or some other material which can conformally coat a substrate, then a slot waveguide geometry as in FIG. 7A can be used to enhance the electro-optic coupling. The presence of a slot in the center of the waveguide causes the optical electric field to be increased in the slot region, increasing the overlap with the EO material, as shown on FIG. 7B. Another advantage of this design is that the two halves of the waveguide on either side of the slot could themselves be used as electrodes, as shown on FIG. 7A. In this case, since the applied microwave voltage would drop across a very small gap (e.g., 100-300 nm), the corresponding electric field would be much larger, thereby increasing the coupling rate.

The invention claimed is:

1. Apparatus for providing coherent coupling between an optical signal and a microwave signal, the apparatus comprising:
   a planar photonic crystal optical resonator;
   a microwave resonator disposed to interact with the planar photonic crystal optical resonator, wherein at least part of the microwave resonator is configured to be superconducting when the apparatus is operating;
   an active medium disposed such that first electromagnetic field from the planar photonic crystal optical resonator and second electromagnetic field from the microwave resonator overlap within the active medium;
   wherein the active medium has a second order nonlinearity capable of generating a sum frequency signal and/or a difference frequency signal from the first and second electromagnetic fields.

2. The apparatus of claim 1, further comprising an optical source configured to provide an optical pump field to the planar photonic crystal optical resonator, whereby coherent coupling between the planar photonic crystal optical resonator and the microwave resonator is provided.

3. The apparatus of claim 2, wherein the apparatus is configured to provide quantum coherent coupling between the planar photonic crystal optical resonator and the microwave resonator.

4. The apparatus of claim 2, wherein the apparatus is configured to provide classical coherent coupling between the planar photonic crystal optical resonator and the microwave resonator.

5. The apparatus of claim 1, wherein the planar photonic crystal optical resonator is configured as a 1-D photonic crystal resonator or as a 2-D photonic crystal resonator.

6. The apparatus of claim 1, wherein the microwave resonator includes a planar capacitor having capacitor plates disposed to sandwich the planar photonic crystal optical resonator.

7. The apparatus of claim 6, wherein the microwave resonator is an LC resonator having capacitance provided by the planar capacitor and inductance provided by a Josephson junction array.

8. The apparatus of claim 6, wherein the microwave resonator is an LC resonator having capacitance provided by the planar capacitor and inductance provided by a spiral inductor.

9. The apparatus of claim 6, wherein the microwave resonator is an LC resonator having capacitance provided by the planar capacitor and inductance provided by a meander inductor.

10. The apparatus of claim 1, wherein the active medium is configured as a substrate on which the planar photonic crystal optical resonator and the microwave resonator are disposed.

11. The apparatus of claim 1, wherein the planar photonic crystal optical resonator includes the active medium.

12. The apparatus of claim 1, wherein the active medium is configured as a layer of active medium disposed on a substrate of a different material.

13. The apparatus of claim 1, wherein the active medium is configured as a layer of active medium suspended over a substrate.

14. The apparatus of claim 13, wherein the active medium includes an acoustic insulator structure configured to reduce acoustic radiation away from the microwave resonator.

15. The apparatus of claim 14, wherein the acoustic insulator structure includes a photonic crystal structure.

16. The apparatus of claim 1, wherein the active medium is selected from the group consisting of: lithium niobate, lithium tantalate, and gallium arsenide.

17. The apparatus of claim 1, wherein the microwave resonator is configured to apply a DC electric field to the optical resonator, thereby altering an optical resonance frequency of the optical resonator.

18. The apparatus of claim 1, wherein the planar photonic crystal optical resonator includes a waveguide having a slot, and wherein the active medium is disposed in the slot.

19. The apparatus of claim 1, wherein the active medium comprises an electro-optic polymer.

* * * * *